United States Patent [19]

Hoshi

[11] 4,455,576

[45] Jun. 19, 1984

[54] PICTURE DISPLAY DEVICE

[75] Inventor: Hideo Hoshi, Tokyo, Japan

[73] Assignee: Seiko Instruments & Electronics Ltd., Tokyo, Japan

[21] Appl. No.: 323,494

[22] Filed: Nov. 20, 1981

[30] Foreign Application Priority Data

Apr. 7, 1981 [JP] Japan .................................. 56-52275
Jun. 1, 1981 [JP] Japan .................................. 56-84037

[51] Int. Cl.$^3$ ............................................. H04N 5/66
[52] U.S. Cl. .............................. 358/230; 358/236/241
[58] Field of Search ...................... 358/236, 230, 241; 340/784

[56] References Cited

U.S. PATENT DOCUMENTS 4,100,579 7/1978 Ernstoff .............................. 358/230

Primary Examiner—Richard Murray
Attorney, Agent, or Firm—Robert E. Burns; Emmanuel J. Lobato; Bruce L. Adams

[57] ABSTRACT

An active matrix type liquid crystal display device driven by a switching transistor array consists of a MOS-FET is disclosed. A common electrode opposite to picture element electrodes is divided in a line direction by the width equivalent to plural lines of the picture element electrodes. The poralities of video signals applied to the picture element electrodes and of the voltage of the common electrode are inverted in the line sequential.

11 Claims, 20 Drawing Figures

PICTURE DISPLAY DEVICE

BACKGROUND OF THE INVENTION

The present invention relates to a structure and driving method for a picture display device using a liquid crystal.

FIG. 1 shows a circuit structure for a conventional picture display device to display a picture in accordance with analogue signals, the picture display device being comprised of a liquid crystal and an MOS-FET array. A unit picture element comprises a MOS-FET 1, a storage capacitor 2, and a liquid crystal cell 3. The fundamental operation of the picture display device will be illustrated. When a negative pulse voltage is applied to a gate line $x_i$ as a gate signal, the P-channel MOS-FET 1 is in an ON state and analogue video signals applied to a signal line $y_i$ are charged in the storage capacitor 2 via the FET 1. The FET 1 is in an OFF state if the negative pulse signal is terminated, however, since a leak current through the FET 1 and a current through the liquid crystal cell 3 are exceedingly small in general, the voltage charged in the storage capacitor 2 is maintained for a considerably long time and kept applied to the liquid crystal cell 3. The gate signals are scanned from $x_i$ to $x_i+1, x_i+2 \ldots$ in a line sequence, and the video signals corresponding to the position of the gate signals are applied from $y_i, y_{i+1}, y_{i+2} \ldots$, whereby the overall picture is displayed.

FIG. 2 shows a sectional view of a picture element including the FET. In the case of the P-channel FET, numeral 4 denotes an n-type Si substrate, 5 and 6 respectively denote a source and drain in the P+ diffusion region. The source 5 is connected in the $y_i$ direction in FIG. 1. Numeral 7 denotes a gate oxide, and 8 denotes a gate electrode connected in the $x_i$ direction. Numeral 9 denotes a picture element electrode of the liquid crystal cell forming one electrode, and a condensor is formed between a thin oxide 11 and the substrate 4. Numeral 12 denotes a liquid crystal, and 13 denotes a transparent counter electrode which functions as a common electrode for the overall picture area. Numeral 14 denotes a glass substrate and 10 denotes an insulating layer. In this structure, the voltage polarity applied to the liquid crystal is in one direction for direct-current drive. Accordingly this structure is disadvantageous in reliability, e.g., the life of the liquid crystal is short. In order to eliminate the above noted drawbacks, the following proposal has been made. Namely, the common electrodes of the liquid crystal cells are grouped in common lines as shown in FIG. 3, and the gate signal lines $x_i, x_{i+1}, x_{i+2} \ldots$ are synchronized with the common electrode lines $z_i, z_{i+1}, z_{i+2}$ to be scanned in turn, and the video signals and the common electrode electric potentials are simultaneously inverted for expecting an alternating drive (Japanese Laid Open Patent No. 120095/80). In this method, however, it is necessary to connect the common electrode with the circuit by dividing it into 240 in order to display 240×240 picture elements, whereby the mounting of the common electrode is very difficult.

BRIEF SUMMARY OF INVENTION

Accordingly, it is an object of the present invention to provide a picture display device which can be alternately driven and easily mounted.

BRIEF DESCRIPTION OF THE DRAWINGS

In the accompanying drawings, there are shown illustrative embodiments of the invention from which these and other objects, novel features, and advantages will be readily apparent.

In the drawings.

DETAILED DESCRIPTION OF THE INVENTION

Figure 4:
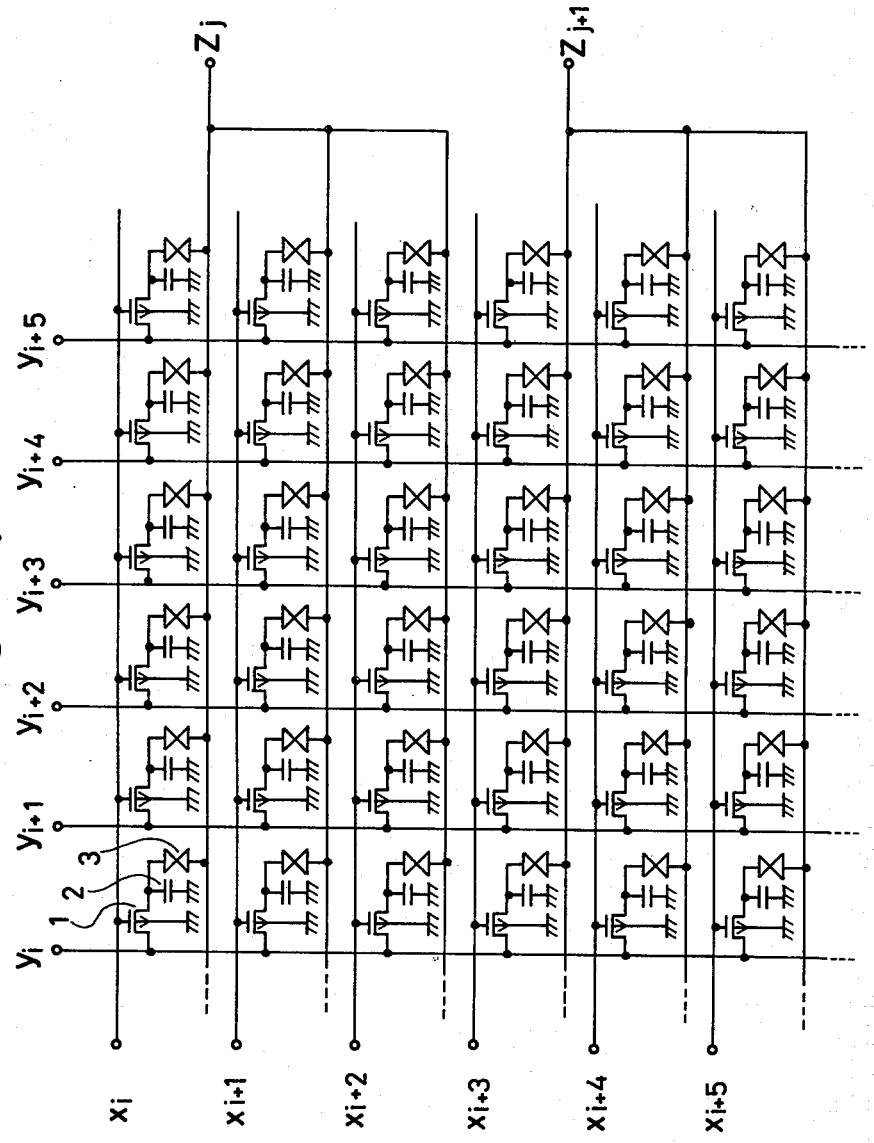
FIG. 4 shows a circuit diagram of one embodiment of a picture display device according to the present invention.

Referring to the drawings, in FIG. 4 there is shown an embodiment of the structure for a display device according to the present invention. The MOS-FET 1, the storage capacitor 2 and the liquid crystal cell 3 are identical to the conventional type, however, the common electrode lines are common in plural groups of lines, i.e. one common electrode corresponds to 3 lines of picture element electrodes in this embodiment.

Figure 1:
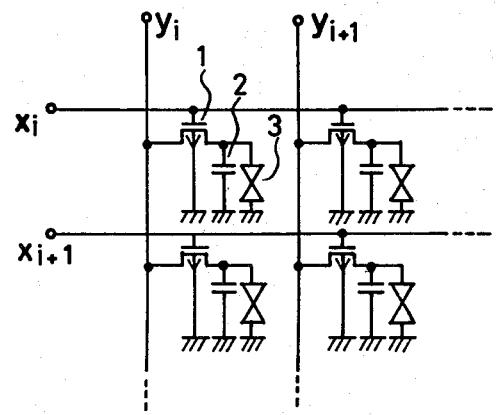
FIG. 1 shows a circuit diagram of the conventional picture display device.
Figure 2:
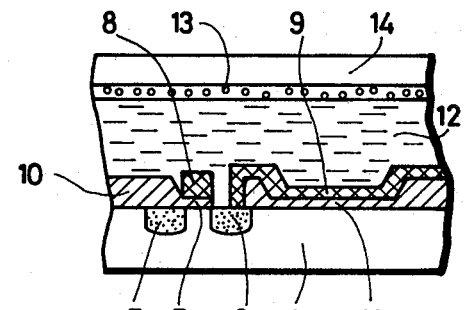
FIG. 2 shows a sectional view thereof.
Figure 3:
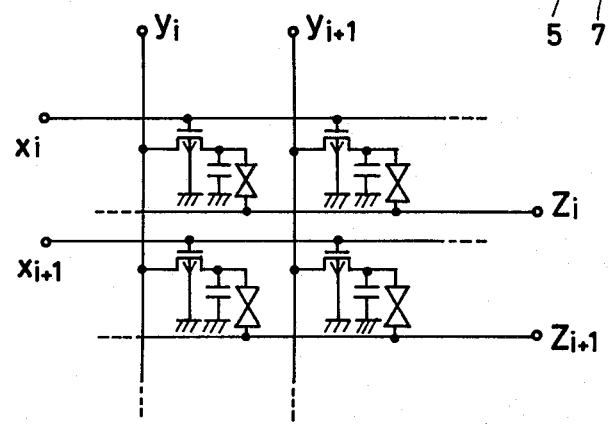
FIG. 3 shows a circuit diagram of the conventional picture display device.
Figure 5:
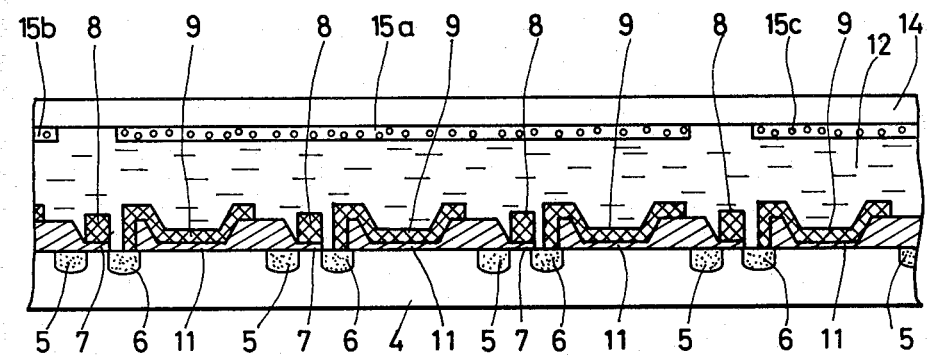
FIG. 5 shows a sectional view thereof.
Figure 6:
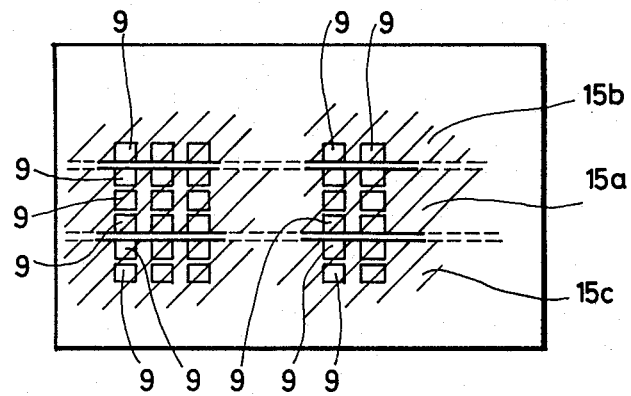
FIG. 6 shows a plan view thereof.
Figure 7:
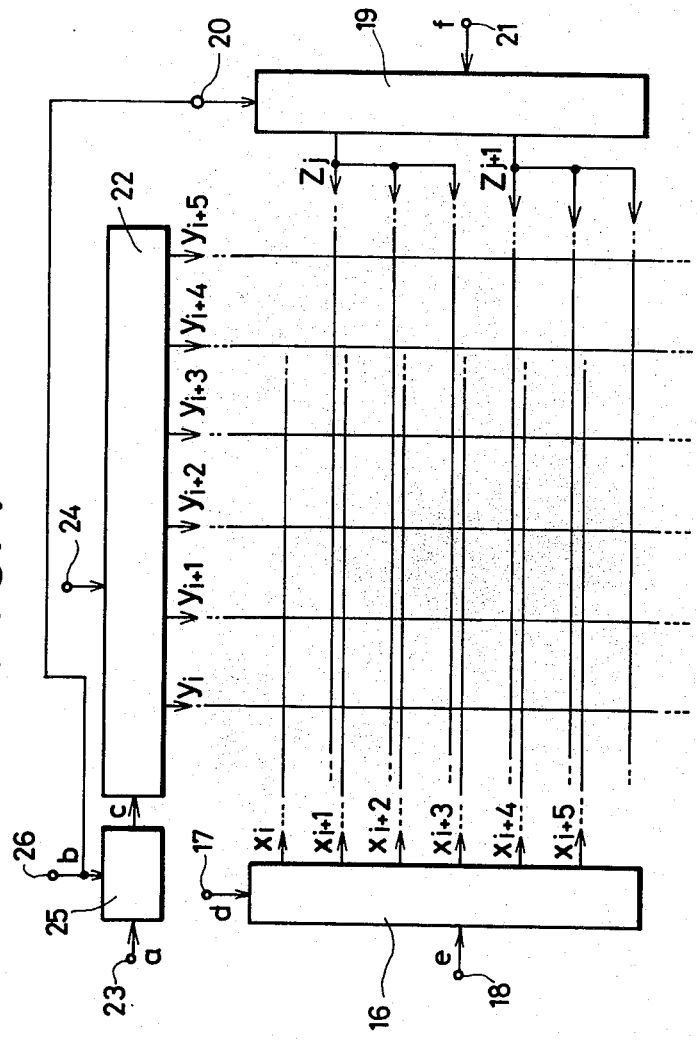
FIG. 7 shows a block diagram of the display panel and the peripheral drivers according to the present invention.
Figure 8:
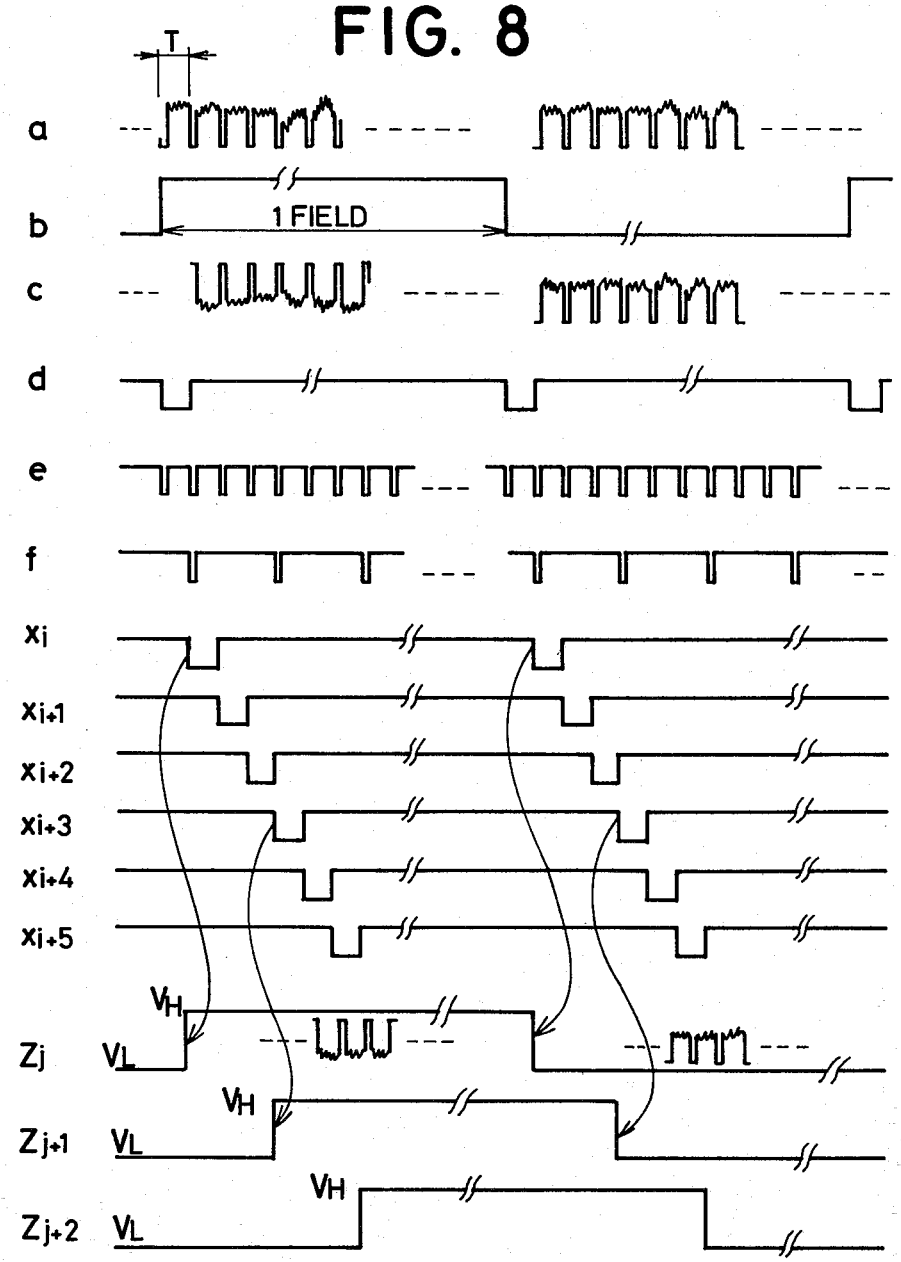
FIG. 8 shows an explanatory diagram of each waveform in the circuit in FIG. 7.

FIG. 5 shows a sectional view of the display device according to the present invention. In the case of a P-channel MOS-FET, numerals 4 to 12 represent the identical portions as in FIG. 2. Numerals 15a, 15b and 15c denote transparent electrodes corresponding to $z_j$, $z_{j+1}$ . . . in FIG. 4, connected in the $x_i$ direction in a width dimension corresponding to 3 lines-picture electrodes 9 and divided in the $y_i$ direction. Accordingly, in the embodiment shown in FIGS. 4 and 5, the number of the common electrode lines is $\frac{1}{3}$ of that of the gate lines, i.e., the picture elements in the line direction. FIG. 6 shows a plan view of FIG. 5. FIG. 7 shows a panel and peripheral drivers of the present invention. In FIG. 7, numeral 16 denotes a driver for gate lines x which consists of a shift register, 17 denotes a serial data input terminal, 18 denotes a clock signal input terminal, 19 denotes a driver for the common electrode lines z which changes over the predetermined two electric potentials in turn in synchronism with the clock signals, 20 denotes a serial data input terminal, 21 denotes a clock signal input terminal, 22 denotes a driver for sampling video signals to apply to the signal lines y, 23 denotes a video signal input terminal, 24 denotes a clock signal input terminal, 25 denotes a video signal polarity change-over circuit and 26 denotes an input terminal for video signal polarity change-over signals. FIG. 8 shows waveforms of each part.

The operation of the circuits will be illustrated in conjunction with FIGS. 7 and 8. Initially a positive polarity video signal a is applied to the terminal 26. When a signal b, which inverts at the period of 1 field or an integral multiple of 1 field, is applied to the terminal 26, a video signal c, the polarity of which is inverted at a period of 1 field or an integral multiple of 1 field by the video signal polarity change-over circuit 25, is applied to the signal line driver 22. A pulse d having a shorter pulse width than the period T corresponding to one scanning line is applied to a serial input terminal of the gate line driver 16 synchronized with the inversion signal b, and a pulse e having a period T is serially fed to the clock signal input terminal 18. Accordingly write pulse signals $X_i$, $X_{i+1}$, $X_{i+2}$ . . . are respectively applied to each of the gate lines $x_i$, $x_{i+1}$, $x_{i+2}$ . . . . Namely the P channel FETs are in an "ON" state in the line sequence, and video signals corresponding to each position of the picture elements are applied from the signal lines $y_i$, $y_{i+1}$, $y_{i+2}$ . . . and charged in each respective storage capacitor in the order of the lines. In other words the desired voltage is applied to the picture electrodes in the line sequence.

Further the inversion signal b is applied to the serial input terminal 20 of the common electrode line driver 19, a pulse f having a period 3T is applied to the clock input terminal 21, and the electric potentials of each of the common electrode lines $z_j$, $z_{j+1}$ . . . synchronize with the pulse f per each 1 field or each integral multiple of 1 field and repeat the inversion between the high voltage $V_H$ and the low voltage $V_L$ in turn. Accordingly, the picture element electrode lines corresponding to the gate lines $x_i$, $x_{i+1}$, $x_{i+2}$ face the common electrode $z_j$, and the picture element electrode lines corresponding to the gate lines $x_{i+3}$, $x_{i+4}$, $x_{i+5}$ face the common electrode $z_{j+1}$. Likewise, the voltage polarity applied to the liquid crystal is inverted per each three lines of picture elements per 1 field or per integral multiple of 1 field, to enable the alternating drive.

The relationship between the common electrode electric potentials $V_H$, $V_L$ and the video signals is set so that the difference in the electric potential between the non-inverted video signal C-P and $V_L$ may be substantially equal to the difference in the electric potential between the inverted video signal C-n and $V_H$ as additionally illustrated in the waveform $z_j$ in FIG. 8, i.e. the transparency of the liquid crystal may be equal. The number of the common electrode lines may be $\frac{1}{3}$ of that of the picture element lines in this embodiment as illustrated above, so the common electrode lines are 80 in the case of the display panel comprising 240×240 picture elements. Namely the common electrode lines are divided into 80.

Figure 9:
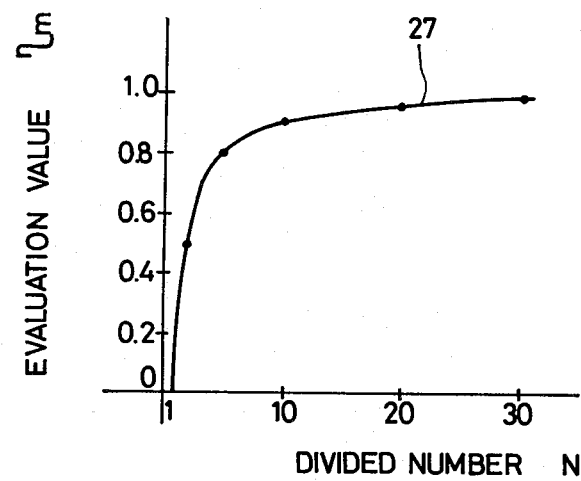
FIG. 9 is an explanatory diagram showing the relationship between the picture quality evaluation value $\eta m$ and the common electrode divided number N in the waveforms in FIG. 8.

The relationship between the divided number N of the common electrode lines and the picture quality will be examined. The picture quality evaluation value $\eta$ will be represented by;

$$\eta = \frac{t_p - t_n}{t_p + t_n}$$

where $t_p$ indicates the time that each picture element normally displays the picture (positive display), and $t_n$ indicates the time for the negative display. Namely the evaluation value $\eta$ indicates the time ratio to normally display the picture. $\eta=0$ indicates that the picture is "gray" by feeding any signal since the positive display and the negative display are in the equal ratio. Therefore the evaluation value $\eta$ of each picture element line is calculated to find the average value $\eta m$ of $\eta$ of the overall picture. The relationship between the divided number N of common electrode lines and the evaluation value $\eta m$ will be shown by a curve 27 in FIG. 9. The curve 27 indicates that the polarity is inverted per each 1 field, and the inversion timing for the common electrode electric potential is synchronized with the signal write timing pulse for the picture element line at the end of the plural opposite picture element electrodes and that the number of lines of the picture elements are larger than the divided number of the common electrode. We confirmed that a sufficiently clear picture is attained if the evaluation value $\eta m$ is more than 0.9 and preferably more than 0.95. FIG. 9 teaches that the common electrode lines divided into more than 10 is practicably sufficient, and a sufficiently clear picture is attained by the common electrode lines divided into more than 20. Accordingly, although the divided number of the common electrode lines is decided by the width of three lines of picture elements in the embodiment illustrated so far, the width of the common electrode may be selected so that the divided number thereof may be more than 10 and preferably more than 20 depending on the number of the picture elements and the size of the overall picture area. In the case of 240×240 picture elements divided into 10, for example, the width of the common electrode corresponds to 24 lines-picture elements. Namely, in the case a number of fine picture elements are driven by using the MOS-FET, the conventional method of dividing the common electrodes per each picture element line is exceedingly inferior with respect to the rate of acceptance and cost. On the other hand, according to the present invention, a sufficiently excellent picture is realized and the mounting of the common electrode is exceedingly simplified by the alternating drive on the condition that the common electrode lines are divided into 10 or 20 by the width of the plural picture element lines.

Figure 10:
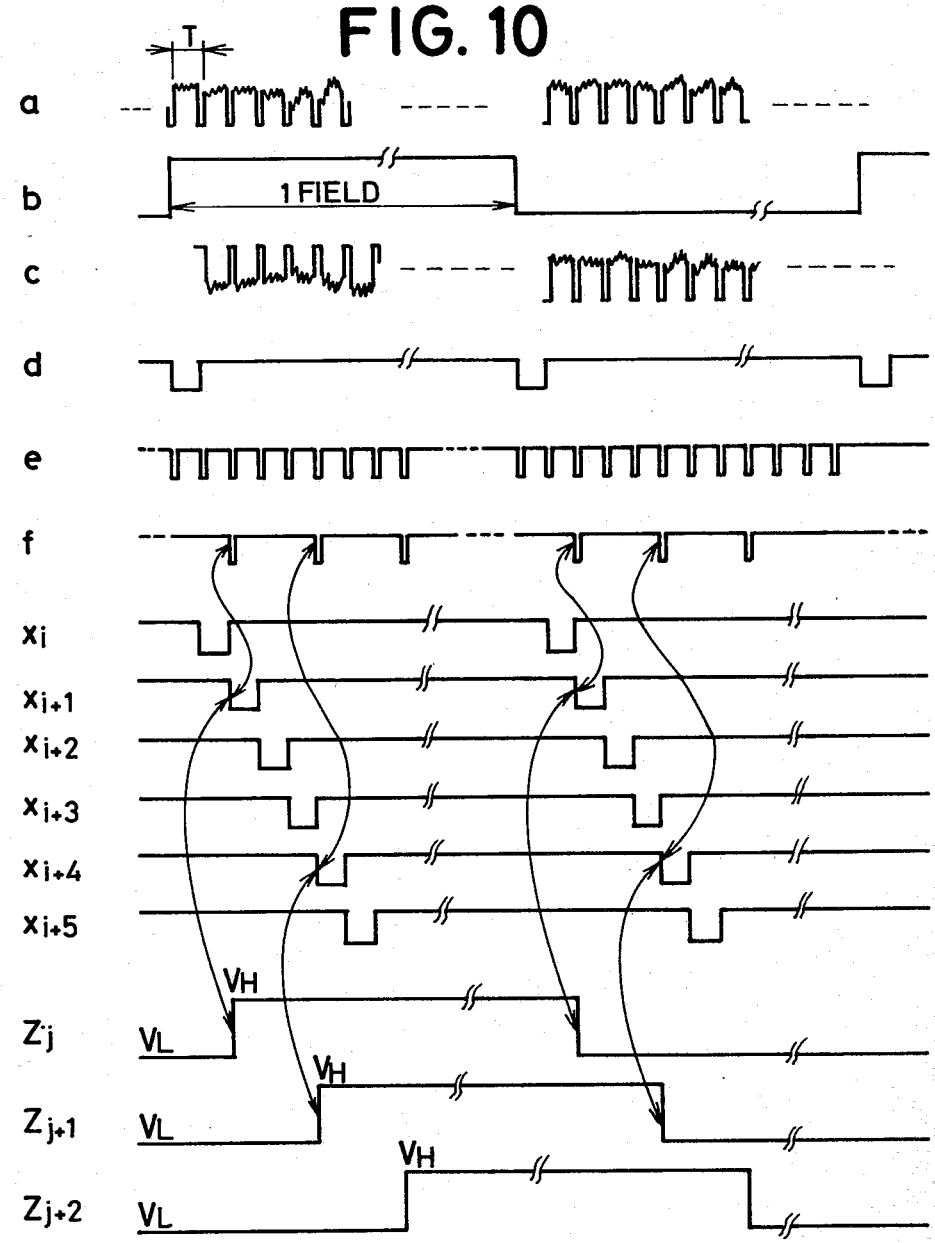
FIG. 10 is an explanatory diagram showing the waveform of each part in another embodiment of the present invention.

FIG. 10 shows the waveforms of each part in another embodiment of the present invention, in which the circuit structure thereof is the same as in FIG. 7. Namely the electric potentials for the common electrodes $z_j$, $z_{j+1}$ . . . are inverted to coincide with the video signal inversion timings for the picture element line at the center of the opposite picture element lines. In the embodiment of FIG. 10, the inversion timings for the common electrode $z_j$ are synchronized with the video signal inversion timings for $x_{i+1}$ at the center of the opposite picture element lines $x_i$, $x_{i+1}$, $x_{i+2}$, i.e., the write pulse $X_{i+1}$. In the same way the inversion of $z_{i+1}$ is synchronized with the write pulse $X_{i+4}$.

The picture quality evaluation value will be described with respect to the case where the common electrode inversion timings are synchronized with the write pulses of the picture element line at the end of the opposite picture element lines as shown in FIG. 8, and the case where the common electrode inversion timings are synchronized with the write pulses of the picture element line at the center of the opposite picture element lines as shown in FIG. 10. In the case the inverting operation is carried out once for each one field and the number of picture element lines is 240, $t_p:t_n=240:0$ at the picture element line $x_i$, $t_p:t_n=239:1$ at $x_{i+1}$, and $t_p:t_n=238:2$ at $x_{i+2}$, so $\eta(x_i)=1$, $\eta(x_{i+1})=0.992$ and $\eta(x_{i+2})=0.983$, in the embodiment in FIG. 8. In the same way, $\eta(x_i)=0.992$, $\eta(x_{i+1})=1$ and $\eta(x_{i+2})=0.992$ in the embodiment in FIG. 10. The average of the picture quality evaluation value is larger in the embodiment in FIG. 10 than in the embodiment in FIG. 8.

Figure 11:
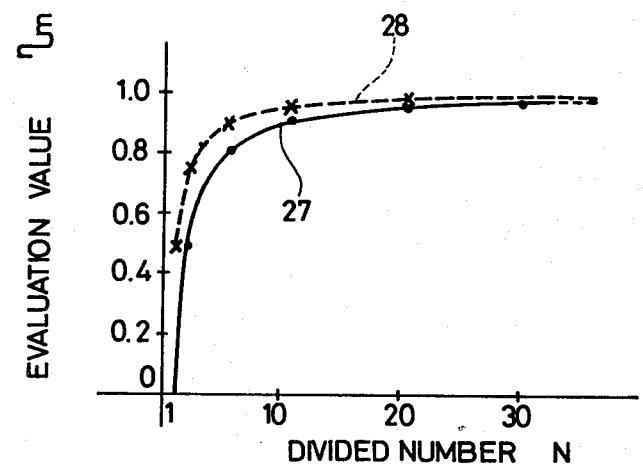
FIG. 11 is an explanatory diagram showing the relationship between the picture quality evaluation value and the common electrode divided number N in the waveform in FIGS. 8 and 10, FIGS. 12A and 12B are explanatory diagrams showing the positional relationship between the common electrode and the picture element lines in which the inverting operations are synchronized.

The relationship between the common electrode divided number N and the evaluation value $\eta_m$ in the embodiment of the time chart in FIG. 10 is shown by a curve 28 in FIG. 11. The curve 27 in FIG. 11 is identical with the curve 27 in FIG. 9 and has been included for comparison purposes between the curves 27 and 28. As understood from FIG. 11, the embodiment in FIG. 10 realizes a display of substantially the same picture quality as the embodiment in FIG. 8 by using half the divided number of common electrode lines. Namely, the divided number N of more than 20 is required to exceed the evaluation value of 0.95 to attain a sufficiently clear picture in the embodiment in FIG. 8, while the divided number N of more than 10 is sufficient in the embodiment in FIG. 10. The same effect is realized by coinciding the inversion timing for the common electrode with the video signal inversion timing for the picture element line at substantially the center of the opposite picture element lines, and it is not necessary to coincide with the inversion timing for the picture element line at just the center of the opposite picture element lines.

Figure 12A:
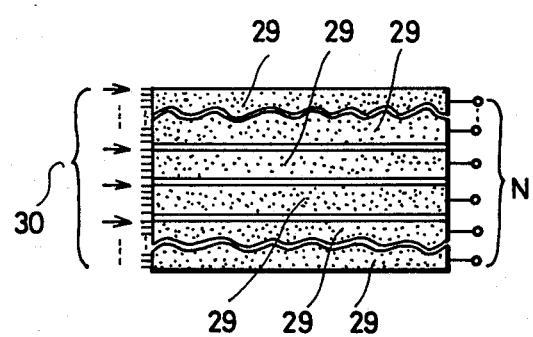
Figure 12B:
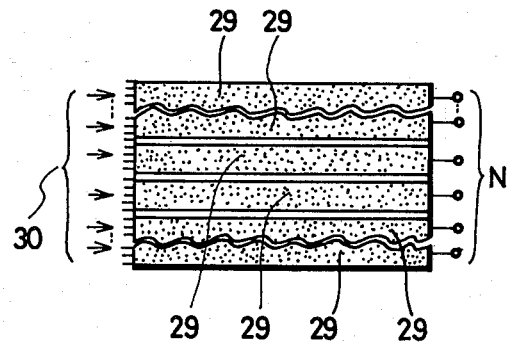

FIG. 12 show the schematic diagram of the embodiments of FIGS. 8 and 10. FIG. 12A shows the embodiment of FIG. 8, in which the voltage polarity inversion timing for a common electrode 29 divided into N is synchronized with the video signal inversion timing for the picture element line (shown by arrows) at the end of a picture element group 30 opposite to each common electrode. FIG. 12B shows the video signal inversion timing for the picture element line at the center of the opposite picture element lines shown by arrows synchronized with the inversion timing for the common electrode.

Figure 13:
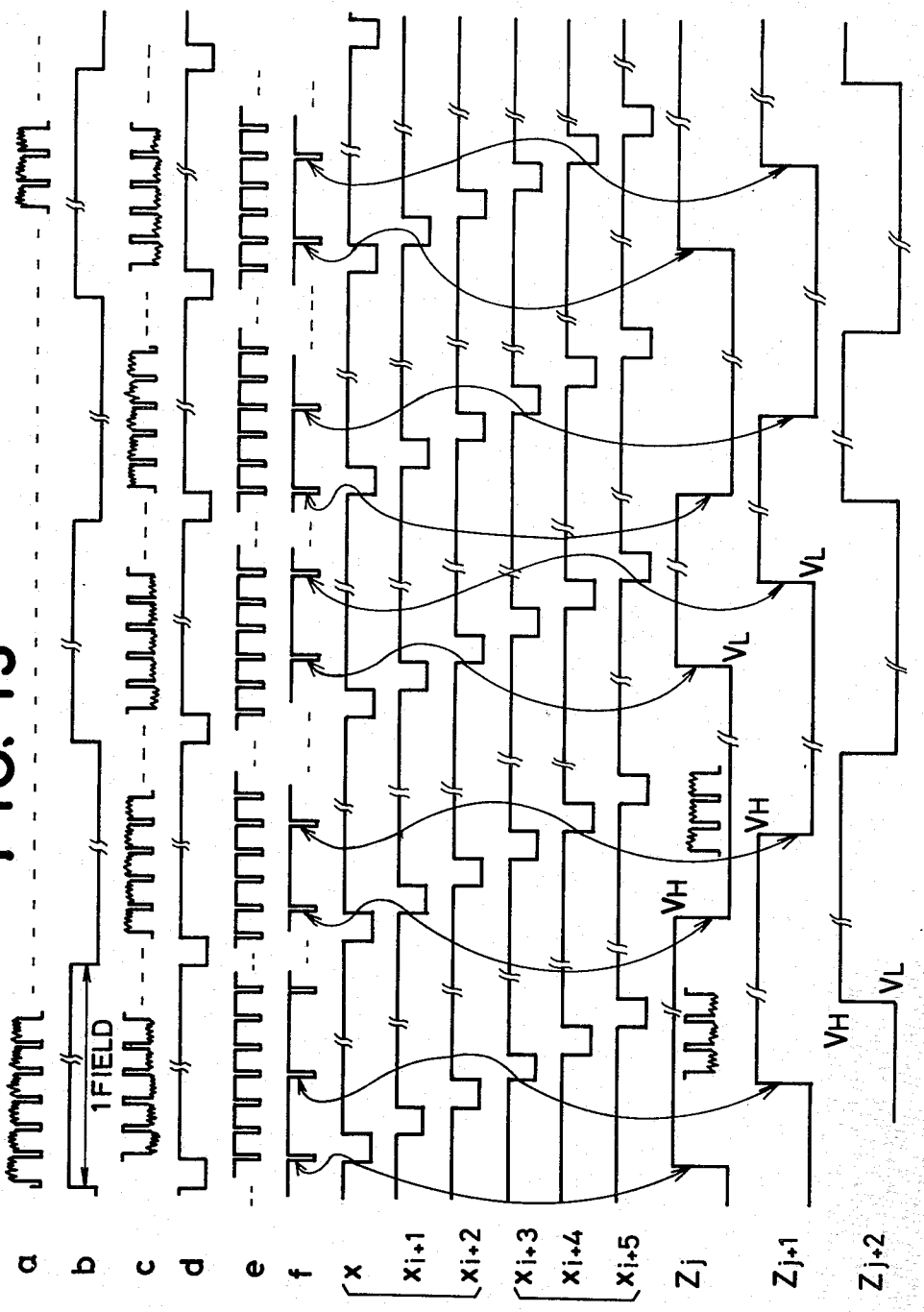
FIG. 13 is an explanatory diagram showing each waveform in another embodiment of the present invention.

FIG. 13 shows waveforms of each part in the another embodiment of the present invention, in which the circuit structure is identical with FIG. 7. Namely a clock pulse f is applied to synchronize the inversion timings for the common electrodes, $z_j$, $z_{j+1}$ . . . with the write pulses of some picture element line of the opposite picture element lines, and to change the synchronized picture element lines in turn. Namely, in FIG. 13 the inversion timing for $z_j$ is synchronized with the first write pulse $X_i$ of the opposite picture element lines, and the inversion timing for $z_{j+1}$ is synchronized with the write pulse $X_{i+3}$ similarly. Then the next inversion timing for $z_j$ is synchronized with the second write pulse $X_{i+1}$ of the opposite picture element lines, and the inversion timing for $z_{j+1}$ is synchronized with the write pulse $X_{i+4}$ similarly. The inversion timings for the next $z_j$ is synchronized with the third write pulse $X_{i+2}$ of the opposite picture element lines, and the inversion timings for $z_{j+1}$ is synchronized with the write pulse $X_{i+5}$ similarly. Further, the inversion timings for the next $z_j$ and $z_{j+1}$ respectively return to the initial write pulses $X_i$ and $X_{i+3}$.

The reason why the inversion timings for the common electrode are shifted in turn will now be illustrated.

Figure 14:
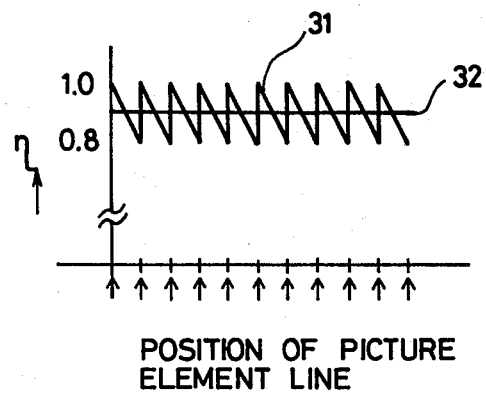
FIG. 14 is an explanatory diagram showing the evaluation values at each picture element line.

In the case the inversion timings for the common electrode always synchronize with the write pulse of the same picture element line, the evaluation value $\eta$ is different in each picture element line. This state is shown by a saw-tooth curve 31 in FIG. 14. It shows that the inversion timing for the common electrode is synchronized with the write pulse of the first picture element line of the opposite picture element lines as indicated by the arrows, when N=10. The evaluation value $\eta$ decreases in a direction away from the picture element line on which the write pulse for it coincides with the inversion timing for the common electrode, as understood from the saw-tooth curve 31 in FIG. 14. Namely, since the applied voltages for the liquid crystal are different at each picture element line even if the same voltage video signals are applied to the video signal input terminal 23, a non-uniformity in density is generated on the picture. Therefore the picture is unnatural at the border portion of the common electrode. The non-uniformity in density more or less appears even if the evaluation value $\eta_m$ is around 0.9, and this phenomenon appears notably as the divided number N decreases. However, when the inversion timings for the common electrode are synchronized with the write pulses of the different picture element lines in turn, then the phenomenon that the evaluation value $\eta$ is different per each picture element does not occur as shown by a line 32 in FIG. 14, and an exceedingly excellent picture without unnaturalness is attained. While in FIG. 13 the picture element lines the write pulses of which are synchronized with the inversion timings for the common electrode change in turn, it is to be noted that the above-mentioned picture element line may be changed at random, or the picture element line which is synchronized with the inversion timing may be changed at each plural inversions.

Figure 15:
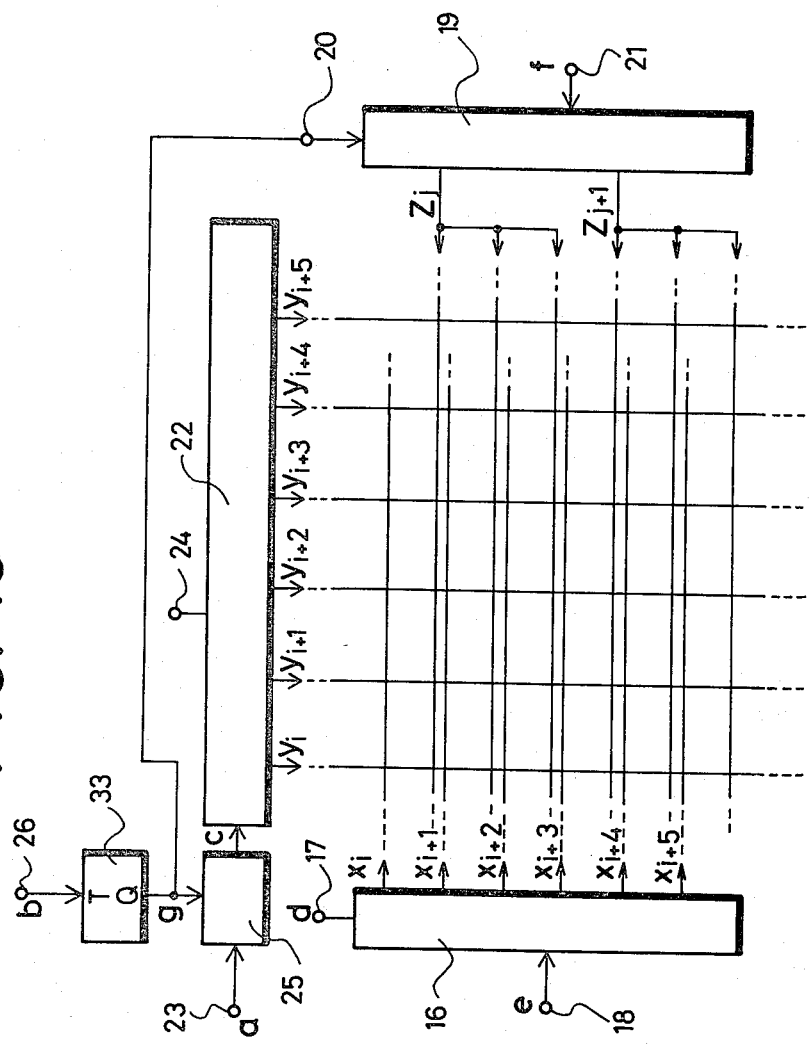
FIG. 15 is a block diagram showing the display panel and the peripheral drivers showing another embodiment of the present invention.
Figure 16:
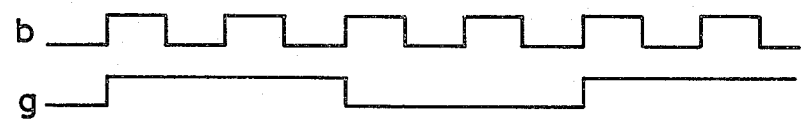
FIG. 16 is an explanatory diagram showing an input waveform and output waveform of the frequency divider in FIG. 15.

FIG. 15 shows another embodiment of the present invention comprising the panel and the peripheral drivers. FIG. 15 is different from FIG. 7 in that a frequency divider 33 is provided. When the signal b which inverts each 1 field is applied to the input terminal 26 of the frequency divider 33, the divided signal g is produced from the output thereof as shown in FIG. 16. FIG. 16 shows an example in which the frequency is divided into $\frac{1}{4}$. The waveforms of each portion of the embodiment in FIG. 15 have been omitted since the inversion signal b in the embodiments in FIGS. 8, 10 and 13 is merely displaced by the signal g after the frequency division.

Figure 17:
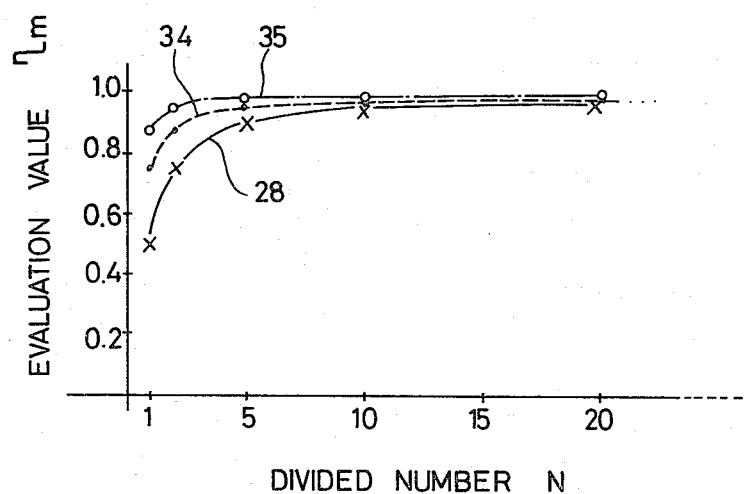
FIG. 17 is an explanatory diagram showing the relationship between the evaluation value and the divided number in the case the inverting period is prolonged.

FIG. 17 shows the evaluation value $\eta_m$ in the case the period for inverting operation is prolonged. The curve 28 in FIG. 17 shows the evaluation value when the inverting operation is performed each 1 field, i.e. the curve 28 is the same as the curve 28 in FIG. 11. A curve 34 shows the evaluation value when the inverting operation is carried out each 2 fields. The curve 34 shows that the same evaluation value is obtained by the half divided number of the common electrode in comparison with the curve 28. Accordingly $\eta_m = 0.95$ is satisfied when N=5. Further a curve 35 shows the evaluation value when the inverting operation is carried out each 4 fields. The curve 35 shows that the same evaluation value is obtained by the ¼ divided number of the common electrode in comparison with the curve 28. Accordingly $\eta_m = 0.94$ is satisfied when N=2. It is preferable that the inverting period is longer when considering only the evaluation value $\eta_m$, however, the flickering of the picture caused by the inverting operation is notable if the inverting period is longer. In the case of the television signal, the 1 field is 1/60 seconds, so that in the cases where the inverting operation is carried out each 1 field, 2 fields and 4 fields, the alternating driving frequencies are respectively 30 Hz, 15 Hz and 7.5 Hz. Though the flickering is not prominent under the driving frequency of 30 Hz, the flickering is prominent under the driving frequencies of 15 Hz and 7.5 Hz. The driving frequency that the flickering becomes prominent differs according to the brightness of the overall panel, i.e., the reflection factor and the density in color of the liquid crystal and the deflecting plate. Therefore the same evaluation value can be obtained by the small divided number N by decreasing the driving frequency, i.e., prolonging the inverting period within the scope wherein the flickering on the picture is not prominent.

The primary objects of the present invention that: (1) the picture display device is easily mounted; and (2) the use of an alternating drive; are completely achieved by applying the picture display device according to the present invention. An excellent picture is obtained even if the divided number of the common electrode lines is 10 or 20, or even around 2 depending on the circumstances.

Figure 18:
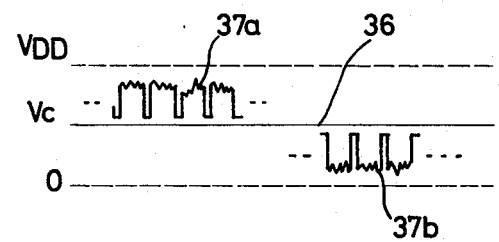
FIG. 18A is an explanatory diagram showing the relationship between the common electrode electric potentials and the video signals in the case the common electrode is alternately driven without division.
FIG. 18B is an explanatory diagram showing the relationship between the common electrode electric potentials and the video signals according to the present invention.
Figure 18:
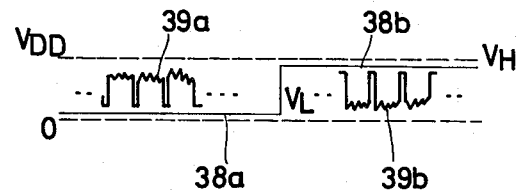

In order to find the evaluation value $\eta_m$ of more than 0.95, the following condition has to be satisfied.

$$N \times H \geq 10$$

Where N indicates the divided number of the common electrode and H indicates the field to carry out the inverting operation. Further, as the inversion in the video signals 39a and 39b and the inversion in the common electrode potentials 38a and 38b are carried out as shown in FIG. 18B in the present invention, the dynamic range of the video signals is substantially the same as the source voltage. On the other hand, in the method of alternating drive of the common electrode as shown in FIG. 18A without division, the bias is set so that non-inverting and inverting video signals 37a and 37b are positioned at above and below the common electrode electric potential 36 which is held constant. Therefore the dynamic range of the video signals is less than half of the source voltage.

Accordingly, the life of the liquid crystal is prolonged and the reliability is improved by the alternating drive, the rate of acceptance is improved and the cost is reduced by simplifying the mounting, and the power consumption is reduced by reducing the source voltage simultaneously.

What is claimed is:

1. In a picture display device comprised of field effect transistors arranged in a line and row configuration and being deposited on a semiconductor layer formed on an insulating substrate, a first electrode receptive of video signals during use of the picture display device and comprising one electrode of each field effect transistor, a second transparent electrode receptive of a voltage during use of the picture display device and being deposited on a transparent substrate opposite to said first electrode and a liquid crystal held between said first and second electrodes, the improvement comprising: said second electrode being divided in a line direction so as to have a width equivalent to plural lines of said first electrode; means to invert the polarity of the video signals applied to the first electrode; and means to sequentially invert the polarity of the voltage applied to the second electrode.

2. A picture display device as claimed in claim 1, wherein the means to invert the polarity of the video signals includes means to invert the video signal polarity of the first electrode line located at the center of said plural first electrodes facing the second electrode simultaneously with the inverting of the voltage polarity of said facing second electrode.

3. A picture display device as claimed in claim 1, wherein the means to invert the polarity of the voltage includes means to invert the voltage polarity at an inverting timing synchronized with the inverting timing for some of the video signals of the plural first electrodes facing the second electrode, and the first electrode line which is synchronized with the inverting timing for the opposite second electrode is changed with the passage of time.

4. A picture display device as claimed in claim 1, 2 or 3, wherein the means to invert the polarity of the video signals includes means to invert the polarity of the video signals each 1 field or each integral multiple of 1 field.

5. A picture display device as claimed in claim 1, wherein the line number of said first electrode is approximately 240 and the line number of said second electrode is within the range of 10 to 20.

6. In a picture display device comprised of a plurality of unit picture elements arranged in a line and row array to define a picture display, the unit picture elements comprising a pair of picture element electrodes one of which is receptive of video signals during use of the picture display device, a common electrode receptive of voltage signals during use of the picture display device and spaced from the pair of picture element electrodes and coacting with one of the picture element electrodes to define therewith a pair of display electrodes, and a liquid crystal material disposed between the pair of display electrodes; means interconnecting the pairs of picture element electrodes of the plural unit picture elements in a line and row array to define an array of picture element electrode lines and picture element electrode rows; the improvement wherein the common electrodes of all the unit picture elements disposed in a plurality of successive groups of lines comprise a single common electrode; means for periodically inverting the polarity of the video signals applied to the picture element electrodes which comprise the display electrodes; and means for sequentially inverting the polarity of the voltage signals applied to the single common electrodes.

7. A picture display device according to claim 6; wherein the single common electrodes are common to groups comprised of at least two successive lines of picture element electrode lines.

8. A picture display device according to claim 6; wherein the single common electrodes are common to groups comprised of three successive lines of picture element electrode lines.

9. A picture display device according to claim 6; wherein the array of picture element electrode lines and rows includes approximately 240 picture element electrodes lines, and the number of single common electrodes is within the range of 10 to 20.

10. A picture display device according to claim 6; wherein the means for sequentially inverting the polarity of the voltage signals includes means for sequentially inverting the polarity of the voltage signals applied to the single common electrodes in synchronism with the inverting of the polarity of the video signals applied to the picture element electrodes of the corresponding groups of the picture element electrode lines.

11. A picture display device according to claim 6; wherein the unit picture elements include a field effect transistor having electrodes connected to the pair of picture element electrodes.

* * * * *